Feb. 23, 1965 R. W. COLE 3,170,656
RAM PRESSURE STEPPING MOTOR CONTROL FOR MISSILE GUIDANCE
Filed March 14, 1962 2 Sheets-Sheet 1

RICHARD W. COLE
INVENTOR

BY Claude Funkhouser
ATTORNEY

United States Patent Office 3,170,656
Patented Feb. 23, 1965

3,170,656
RAM PRESSURE STEPPING MOTOR CONTROL FOR MISSILE GUIDANCE
Richard W. Cole, Silver Spring, Md., assignor to the United States of America as represented by the Secretary of the Navy
Filed Mar. 14, 1962, Ser. No. 179,817
6 Claims. (Cl. 244—14)

This invention relates generally to missile control systems and more particularly to a step function servo system for missile guidance apparatus.

The proper operation of the control systems of guided missiles of certain types requires that attenuators, limits and clamps be provided in the autopilot circuitry employed and that these components be adjusted during different phases of flight. During missile boost they may be controlled on a time basis, while during flight they must have outputs which are functions of absolute ram pressure. The complex character of these functions and the required dynamic range indicate that neither an all-electronic nor a continuous servo follow-up system is feasible. One compensation configuration does have the flexibility of adequately controlling the flight of the missile over a small portion of its dynamic range of operation. Therefore, if several static compensation configurations can be sequentially added or substituted in the guidance circuits, an approximation of continuous adjustment can be made. These additions and substitutions can be made at a plurality of selected pressure levels.

One object of the present invention, therefore, is to provide a step-function servo system that has a minimum of steps while adequately covering the necessary ranges and conditions.

Another object of the invention is to provide a step-function servo system that will be reliable and trouble-free in operation.

As a further object, the invention provides a step-function servo system employing a stepper motor and a novel control circuit therefor.

A still further object of this invention is to provide a motor control that is insensitive to pressure switch contact chatter.

Figure 1:
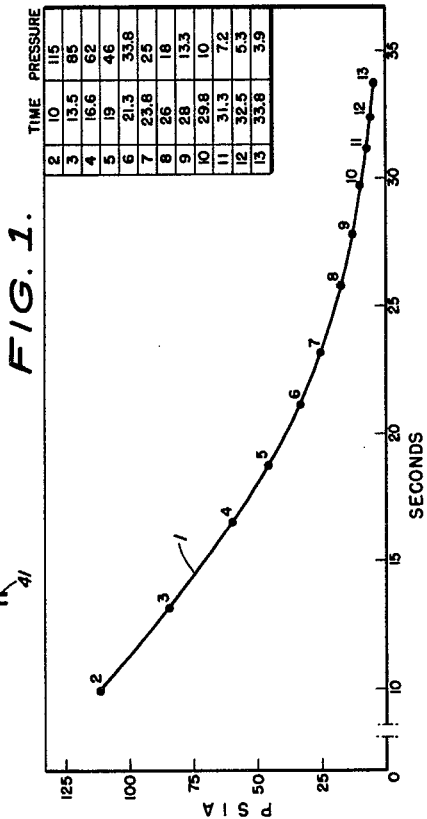
Figure 2:
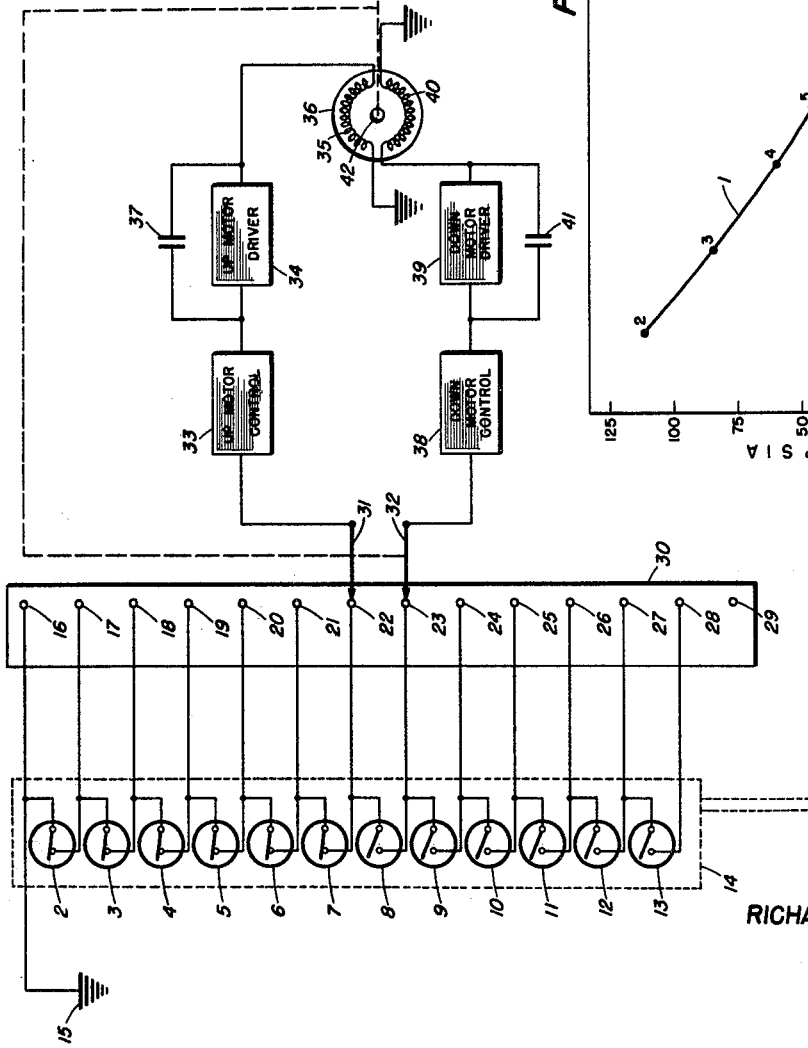
Figure 3:
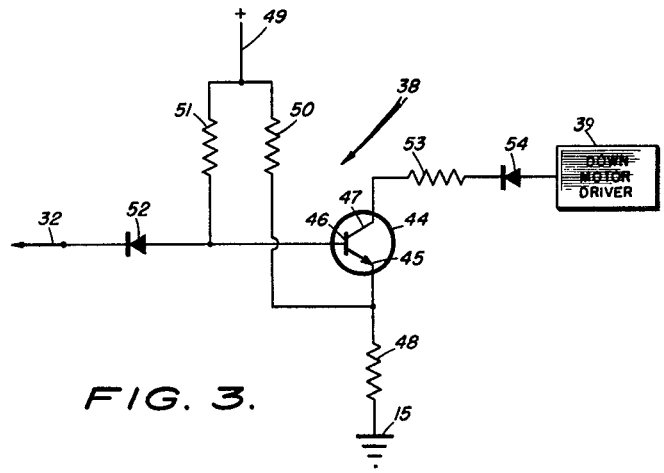
Figure 4:
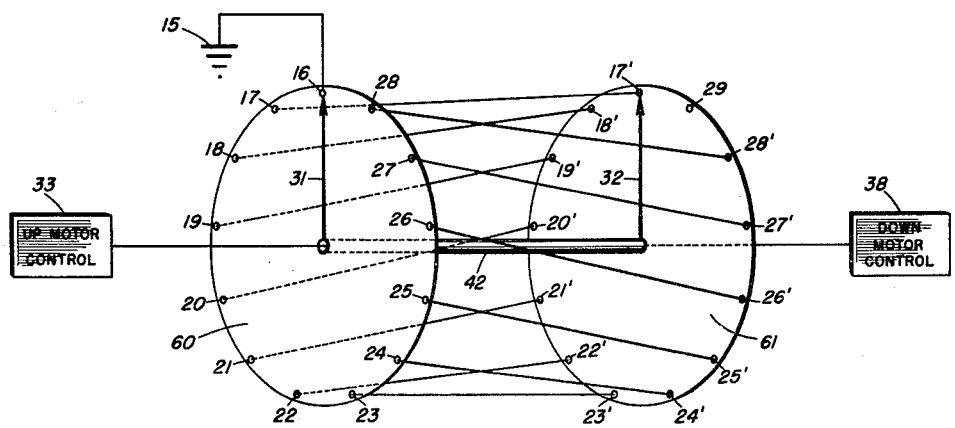

Other objects and many of the attendant advantages of the present invention will be readily appreciated as the same becomes better understood by reference to the following detailed description when considered in connection with the accompanying drawings, wherein:

FIG. 1 is a curve showing the ram pressure plotted against time;
FIG. 2 is a block diagram of an embodiment of the invention;
FIG. 3 is a detail schematic view of the down control circuit employed; and
FIG. 4 is a second embodiment of the follow-up switch card employed.

Briefly, this invention consists of a novel arrangement of a plurality of pressure switches positioned in a manifold that is exposed to a source of ram pressure, a stepper motor controlled by a regulator circuit controlled by the pressure switches, and a load comprising a plurality of compensation switch cards. Each compensation switch card can be rotated through twelve positions. That is, each position is connected to a corresponding pressure switch which determines when that position will be connected to an attenuator, limit or clamp in the guidance system that needs adjustment during flight. Attached to each position of the switch card is a suitable resistor for adjusting a specific part of the guidance system to which it is connected, for a small period of flight.

Pressure switch operating point values have been selected to establish the design values for the resistors selected. Each resistor is switched into the guidance system as it is needed, and as indicated by pressure applied to the pressure switches. This is accomplished by rotating the stepper motor under the control of the pressure switches for rotating the compensation switch cards to the positions providing the correct amount of adjustment.

The cumulative effect of changing the value of the resistance corresponding to an instant ram pressure value is to provide the required continuous adjustment for the attenuators, limits and clamps in the guidance system.

Reference is first made to FIG. 1, where there is shown a ram pressure versus time characteristic curve 1. This curve illustrates the typical rates of ram pressure change encountered by a missile during flight. A table is also shown wherein preselected pressure levels have been assigned to corresponding switch numbers. These levels have been selected as the optimum transitional levels for switching in the various resistance compensation circuits. By switching the compensation circuits of the control system in this manner, an approximation of continuous adjustment is made.

Referring to FIG. 2, there may be seen a block diagram of an embodiment of the invention in which pressure transducers are shown at 2 through 13. Each of the pressure switch transducers 2 through 13 are designed to open on increasing pressure, from a source of ram pressure, in ascending order with the highest value represented by the setting of switch 2. These switches are of the type that open and close gradually under the influence of changing pressure and are similar to the "Transducer, Ram Air Pressure SW-14B," manufactured by the U. S. Gauge Company.

By the selection of this type pressure tranducer, it has been possible to reduce to a negligible level the pressure differential in operating about a switch level. This differential is the difference between switch actuation pressure on increasing pressure and switch actuation pressure on decreasing pressure.

However, by using a pressure switch transducer that opens and closes gradually, a great deal of contact chatter will be encountered. This contact chatter is increased because of the vibrational forces to which the system is prone. It should be understood that the present control system can be used in circumstances where vibrational forces are absent. In such a system the control chatter will be attributed only to the gradual opening or closing of the contacts.

The pressure switch transducers 2 through 13 are connected in series and are located in a pressure manifold 14. The first series connected pressure switch 2 has one terminal connected to ground 15 and is so arranged that when it closes, its junction with the next switch is thereby connected to said ground 15.

Conductors extend from the points of connection between the pressure switches, and from both ends of the chain of said switches, to contacts 16 through 29 respectively, located on a follow-up switch car 30 containing additionally two arms 31 and 32. For ease in explaining its operation, the follow-up switch card 30 is shown containing a row of contacts and two arms. Actually the follow-up switch cards are as shown in FIG. 4, in which a first switch card is shown at 60 and a second switch card is shown at 61, each card having one arm rotated by the motor shaft 42, and the card 60 having contacts numbered corresponding to those on the card 30 up to contact 28. On the card 61 companion contacts are numbered 17' through 28' and 29. The cards are interwired so as to electrically appear as a continuous row of contacts with two arms connected to adjacent contacts, as shown in FIG. 2. The advantages realized by using two switch cards are that the wafers employed may have one less contact each and the arm action is less involved. The follow-up switch cards utilized are similar to the "Parameter Control Switch Bank SW-16A," manufactured by the U.S. Gauge Company.

The arm 31, engaging contact 22 of switch card 30, is connected in series to an "up" motor control circuit 33, an "up" motor driver 34 and a winding 35 of a bi-directional stepping motor 36. The motor is similar to model SM 300–10, manufactured by the Stepper Motors Corporation. A positive feedback loop 37 is connected in parallel with the "up" motor driver 34. The arm 32, engaging contact 23 of the switch card 30, is connected in series with a "down" motor control 38, a "down" motor driver 39 and a winding 40 of the bi-directional stepper motor 36. A positive feedback loop 41 is connected in parallel with the "down" motor driver 39. The stepper motor 36 additionally consists of a motor shaft 42 which mechanically drives the arms 31 and 32 and the compensation switch cards 43. The compensation switch cards utilized are also similar to the "Parameter Control Switch Bank SW–16A," manufactured by the U.S. Gauge Company.

The function of the "up" motor control circuit 33 and the "down" motor control circuit 38 is the same, that is, each circuit applies ground potential to its respective motor driver 34 and 39 when the motor is in the steady state condition. Ground potential is applied to the "up" motor driver 34 through pressure switches 2 through 7, contact 22, arm 31 and "up" control circuit 33. Ground potential is also applied to the input of the "down" motor driver 39 by means of the "down" motor control circuitry 38.

Referring to FIG. 3, there is seen the detailed schematic view of the "down" control circuit 38. This "down" motor control circuit comprises a transistor switch including a transistor 44 having an emitter 45, a base 46 and a collector 47. The emitter 45 is connected to ground 15 through a resistor 48, and to a source of positive potential 49 through a resistor 50. The base 46 is connected to the source of positive potential 49 through resistor 51 and to the down contact arm 32 through a diode 52. The collector 47 is connected to the input of the "down" motor driver 39 by means of a series connected resistor 53 and a diode 54. Said "down" motor control circuit 38 is so arranged to provide a ground input to the "down" motor driver 39 whenever it is connected to an open pressure switch transducer such as transducer 8. Whenever it is connected to a closed pressure switch transducer, the "down" motor control 38 removes the ground input to the "down" motor driver 39.

The outputs of the "up" motor control circuit 33 and the "down" motor control circuit 38 are applied, respectively, to the "up" motor driver 34 and the "down" motor driver 39. These motor drivers are identical and consist of simple astable multivibrators having a motor coil as its load. Each time the multivibrator input is removed from ground, it changes state and draws a current pulse through a coil of the bi-directional stepping motor. This pulse is of sufficient amplitude and duration to rotate the motor to its next position.

As previously mentioned, contact chatter exists during the period of differential pressure. The control circuitry operated by these pressure switch transducers have been made insensitive to this contact chatter or to other minor intermittencies of operation in the switches. This has been accomplished by incorporating a positive feedback circuit 37 for the "up" motor driver 34 and a positive feedback circuit 41 for "down" motor driver 39. Each of the feedback circuits consists of a capacitor arranged to give positive feedback. Therefore, a triggering signal will only be given to a motor driver when the pressure switch transducer connected thereto is open 50 percent of the time. In this manner false signaling is removed during the period of differential pressure.

Referring again to FIG. 2, the invention is shown in a steady state condition wherein the motor has rotated its load, comprising the plurality of compensation switch cards 43, for effectively adjusting the guidance system of a missile for the period during flight wherein the ram pressure value is greater than the value at which the pressure switch 8 will close but less than the value at which the pressure switch 7 will open. This means that pressure switch 7 will be closed, connecting ground potential to the "up" motor control 33 to satisfy its steady state requirements, and pressure switch 8 will be open, satisfying the steady state requirements of the "down" motor control 38.

In operation, an increase in pressure is signified by the opening of pressure switch 7. This removes ground potential from the "up" motor control 33, causing the "up" motor driver 34 to pulse and rotate the motor, for moving the arms 31 and 32, and connecting the load, constituted by the switch cards 43, to the next higher pressure position. Similarly, a decrease in pressure is signified by the closing of pressure switch 8. This connects ground potential to the "down" motor control 38, causing the "down" motor driver to pulse, and rotate the motor, for moving the arms 31 and 32 and connecting the load 43 to the next lower pressure position.

The above described action effectively adjusts the step attentuator to a position corresponding to any of the ranges of pressure defined by the condition of the pressure switches. The action is continuous and the motor 36 will continue to be pulsed until the proper position of the arms 31 and 32 is reached. Since the cards 43 include the guidance circuit compensation resistors for the missile guidance sub-system 56, the appropriate adjustment is effectively switched in when its corresponding pressure level is reached by means of a cable 57 which connects the proper value of resistance to the attenuators, limits and clamps in the guidance sub-system.

Obviously, many modifications and variations of the present invention are possible in the light of the above teachings. It is therefore to be understood that within the scope of the appended claims the invention may be practiced otherwise than as specifically described.

What is claimed is:

1. In combination with a ramjet missile having a guidance system, a step-function servo system comprising, a motor, a pressure manifold, pressure transducer switches located within said manifold, a second switch, a regulator circuit for controlling said motor, said second switch connecting individual pressure transducer switches to said regulator circuit, and a load mechanically connected to the motor and electrically connected to the giudance system, said load being variable by operation of the motor in response to control from said pressure switches and regulator circuit in accordance with ram pressure variations during missile flight.

2. In combination with a ramjet missile having a guidance system, a step-function servo system comprising, a motor, a pressure manifold, a plurality of pressure switches responsive to pressure variations during missile flight by successively closing under changing ram pressure located within said manifold and connected in series circuit relationship, one end of said series switch circuit being connected to ground, a second switch having a plurality of contacts located thereon, and conductors connecting consecutive contacts to consecutive pressure switches, a regulator circuit connected to said motor for controlling said motor, said second switch selectively connecting said pressure switches to said regulator circuit by operation of said motor, and a load mechanically connected to the motor and electrically connected to the guidance system, said load being variable by operation of the motor in response to the closing of said pressure switches.

3. In combination with a ramjet missile having a guidance system, a step-function servo system comprising, a bi-directional setpper motor, a pressure manifold, a plurality of pressure switches responsive to pressure variations during missile flight by successively closing under changing ram pressure within said manifold and connected in series circuit relationship, one end of said series switch circuit being connected to ground, a second switch having a plurality of contacts and a pair of arms located thereon, said arms being slidably connected to pairs of adjacent contacts, conductors connecting consecutive contacts to consecutive pressure switches, a regulator circuit having a first driver circuit and a second driver circuit, a first control circuit rendering said first driver circuit operative when connected to an open pressure switch and a second control circuit rendering said second driver circuit operative when connected to a closed pressure switch, said first driver circuit effecting rotation of said motor in one direction in response to signals from said first control circuit, said second driver circuit effecting rotation of said motor in the opposite direction in response to signals from said second control circuit, said arms being connected to said control circuits for selectively connecting said pressure switches to said control circuits by operation of said motor, and a load mechanically connected to the motor and electrically connected to the guidance system, said load being variable by operation of the motor in response to the closing of said pressure switches for providing compensation variations during missile flight in accordance with changing ram pressure.

4. A step-function servo system for a missile guidance system as recited in claim 3 wherein said first driver circuit and said second driver circuit each include a positive capacitive feedback loop for providing a trigger pulse when the pressure switch connected thereto is open 50 percent of the time.

5. In combination with a ramjet missile having a guidance system, a step-function servo system comprising, a bi-directional stepper motor, a pressure manifold, a plurality of pressure switches within said manifold and connected in series circuit relationship, one end of said series switch circuit being connected to ground, said switches being responsive to pressure variations during missile flight by successively closing under changing ram pressure from the grounded end, a second switch having a first wafer and a second wafer, a first arm and a second arm, said first wafer having a plurality of stationary contacts thereon and said first arm slidably engaging said contacts, said second wafer having a plurality of stationary contacts thereon and said second arm slidably engaging said contacts, said arms being identically oriented and centrally located on each wafer for engaging each contact successively when rotated about their axes, conductors connecting consecutive contacts on said first wafer to consecutive pressure switches, conductors connecting consecutive contacts on said first wafer to consecutive contacts on said second wafer for connecting said arms to adjacent pressure switches, a regulator circuit connected to said motor for controlling said motor, said second switch selectively connecting said pressure switches to said regulator circuit by operation of said motor, and a load mechanically connected to the motor and electrically connected to the guidance system, said load being variable by operation of the motor in response to the closing of said pressure switches.

6. In combination with a ramjet missile having a guidance system, a step-function servo system comprising, a bi-directional stepper motor, a pressure manifold, a plurality of pressure switches within said manifold and connected in series circuit relationship, one end of said series switch circuit being connected to ground, said switches being responsive to pressure variations during missile flight by successively closing under changing ram pressure from the grounded end, a second switch having a first wafer and a second wafer, a first arm and a second arm, said first wafer having a plurality of stationary contacts thereon and said first arm being slidably engaged to said contacts, said second wafer having a plurality of stationary contacts thereon and said second arm being slidably engaged to said contacts, said arms being identically oriented and centrally located on each wafer for engaging each contact successively when rotated about its axis, conductors connecting consecutive contacts on said first wafer to consecutive pressure switches, conductors connecting consecutive contacts on said first wafer to consecutive contacts on said second wafer thereby connecting said arms to adjacent pressure switches, a regulator circuit having a first driver circuit, a second driver circuit, a first control circuit for rendering said first driver circuit operative when connected to an open pressure switch, a second control circuit for rendering said second driver circuit operative when connected to a closed pressure switch, said first driver circuit effecting rotation of said motor in one direction in response to signals from said first control circuit, said second driver circuit effecting rotation of said motor in the opposite direction in response to signals from said second control circuit, said first arm being connected to said first control circuit and said second arm being connected to said second control circuit, said arms selectively connecting said pressure switches to said control circuits by operation of said motor, and a load mechanically connected to the motor and electrically connected to the guidance system, said load being variable by operation of the motor in response to the closing of said pressure switches for providing compensation variations for said guidance system during missile flight in accordance with changing ram pressure.

References Cited by the Examiner
UNITED STATES PATENTS

| | | | |
|---|---|---|---|
| 2,950,076 | 8/60 | Shirey et al. | 244—77 |
| 3,023,616 | 3/62 | Miller et al. | 244—77 |
| 3,079,758 | 3/63 | Vogel et al. | 244—78 X |

SAMUEL FEINBERG, *Primary Examiner.*